(12) United States Patent
Lam et al.

(10) Patent No.: US 7,342,782 B2
(45) Date of Patent: Mar. 11, 2008

(54) LOCKING DEVICE

(75) Inventors: Siu-Ming Lam, Tao Yuan Shien (TW); Jui-Ting Tsai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 11/545,573

(22) Filed: Oct. 11, 2006

(65) Prior Publication Data

US 2007/0197079 A1    Aug. 23, 2007

(30) Foreign Application Priority Data

Feb. 17, 2006   (TW) .............................. 95105491 A

(51) Int. Cl.
*G06F 1/16*    (2006.01)

(52) U.S. Cl. ...................... 361/685; 455/569; 439/345; 174/50

(58) Field of Classification Search ................ 439/345; 296/37.8; 174/50; 348/151; 455/569; 361/679–687, 361/724–727

See application file for complete search history.

(56) References Cited

U.S. PATENT DOCUMENTS

| 7,009,837 | B2 * | 3/2006 | Lo | .............................. | 361/683 |
| 2003/0235031 | A1 * | 12/2003 | Lo | .............................. | 361/685 |
| 2005/0041383 | A1 * | 2/2005 | Lo | .............................. | 361/683 |

* cited by examiner

*Primary Examiner*—Hung Van Duong
(74) *Attorney, Agent, or Firm*—Rabin & Berdo, PC

(57) ABSTRACT

A locking device for locking a removable module on an electronic device is provided. The locking device has a switch, a base and an elastic component. When the base is located in a locked position, the base can prevent the removable module from separating from the electronic device. When the base is located in an unlocked position, the removable module and the electronic device can be separated. The elastic component provides a recovery force when the base is moved from the lock position. The base can be held in the unlocked position when the removable module is installed on the electronic device and the base is moved from the locked position to the unlocked position.

15 Claims, 4 Drawing Sheets

LOCKING DEVICE

RELATED APPLICATIONS

The present application is based on, and claims priority from, Taiwan Application Serial Number 95105491, filed Feb. 17, 2006, the disclosure of which is hereby incorporated by reference herein in its entirety.

BACKGROUND

1. Field of Invention

The present invention relates to a locking device, and more particularly, to a locking device for locking a removable module on an electronic device.

2. Description of Related Art

Compact sizes, light weights and portability have made laptop computers very popular recently. However, due to the dimension limitation, peripherals or removable modules, such as a battery, a floppy disk, a hard disk or a compact disc driver in laptop computers may need to be replaced to expand their functions.

Conventional laptop computers utilize a locking device with a switch to lock removable modules. In operation, users push the switch of the locking device with one hand, and then use the other hand to remove the peripheral or the removable module. However, it is inconvenient, particularly for handicapped users to replace the removable module if two hands are required.

Moreover, since the conventional removable module is removed from the laptop computer in a horizontal direction, this can result in larger space requirements to remove and install the removable module.

Accordingly, providing a locking device to enhance the operating convenience for users and reduce the space needed for replacing a removable module is an issue of great consequence.

SUMMARY

The present invention provides a locking device for locking a removable module on a laptop computer body. The removable module has at least one first block and a second block. The locking device includes a switch, a base, and an elastic component. The switch is disposed on the body. The base is connected with the switch. The base has at least one protruding portion and a positioning portion. The protruding portion is coupled with the first block to prevent the removable module from separating from the body when the base is located in a locked position. The removable module can be separated from the body when the base is moved from the locked position to the unlocked position. The elastic component is disposed between the base and the body. The elastic component provides a recovery force to the base when the base is moved from the locked position. The positioning portion is coupled with the second block to hold the base on the unlocked position when the removable module is on the body and the base is moved from the locked position to the unlocked position.

According to an embodiment, the protruding portion includes two protruding portions disposed on two ends of the base. The removable module has two first blocks. The protruding portions couple with the first blocks when the base is located in the locked position.

According to an embodiment, the protruding portion is coupled with an incline of the first block when the removable module is installed into the body.

According to an embodiment, the positioning portion includes a flexible rod and a head portion. The head portion is coupled with the second block. The base stays on the unlocked position when the removable module is installed on the body and the base is moved from the locked position to the unlocked position.

According to an embodiment, the head portion has a first surface. The first surface is coupled with a second surface of the second block. The flexible rod deforms when the removable module is installed on the body and the base is moving from the locked position to the unlocked position.

According to an embodiment, the first surface is coupled with the second surface for a first coupling length. The protruding portion is coupled with the first block for a second coupling length. The length between the locked position and the unlocked position is longer than the first coupling length. The first coupling length is longer than the second coupling length.

According to an embodiment, the elastic component is a spring.

According to an embodiment, the body has a track. The base moves when the switch slides on the track.

The present invention also provides an electronic device including a body, a removable module and a locking device. The removable module has at least one first block and a second block. The locking device is for locking the removable module on the body. The locking device includes a switch, a base, and an elastic component. The switch is disposed on the body. The base is connected with the switch. The base has at least one protruding portion and a positioning portion. The protruding portion is coupled with the first block to prevent the removable module from separating from the body when the base is located in a locked position. The removable module can be separated from the body when the base is moved from a locked position to an unlocked position. The elastic component is disposed between the base and the body. The elastic component provides a recovery force to the base when the base is moved from the locked position. The positioning portion is coupled with the second block to hold the base in the unlocked position when the removable module is on the body and the base is moved from the locked position to the unlocked position.

According to an embodiment, the removable module is a battery, a floppy disk, a hard disk or a compact disc driver.

It is to be understood that both the foregoing general description and the following detailed description are by examples and are intended to provide further explanations of the invention as claimed.

BRIEF DESCRIPTION OF THE DRAWINGS

These and other features, aspects and advantages of the invention will become apparent by reference to the following description and accompanying drawings, which are given by way of illustration only, and thus are not limitative of the invention, wherein.

DESCRIPTION OF THE PREFERRED EMBODIMENTS

Figure 1:
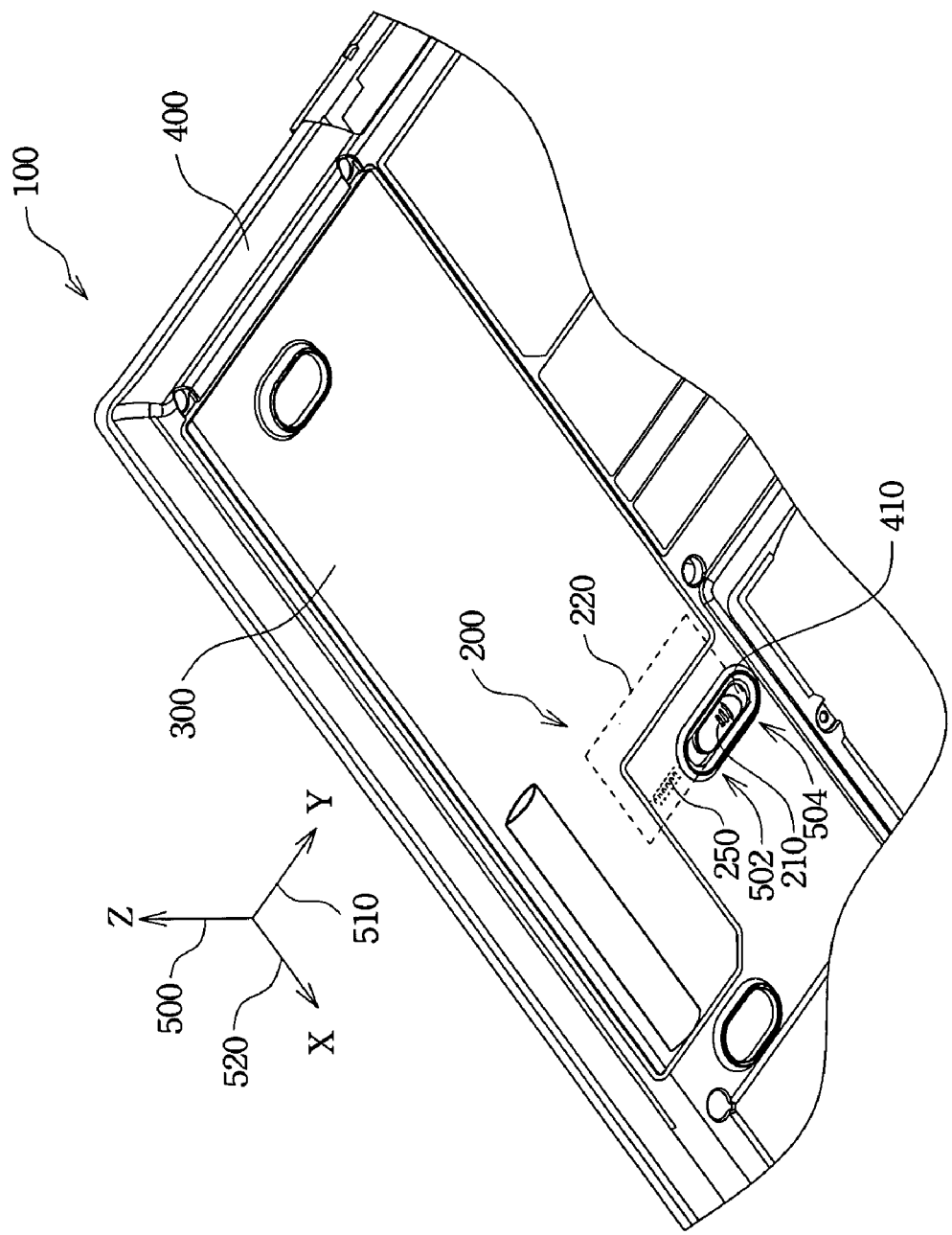
FIG. 1 is a schematic and partial view from outside of an electronic device according to one preferred embodiment of the present invention.

FIG. 1 is a schematic and partial view from outside of an electronic device according to one preferred embodiment of the present invention. Referring to FIG. 1, the electronic device 100, such as a notebook computer, has a locking device 200 located thereon. The locking device 200 is used to lock a removable module 300 such as a battery module, a removable floppy disk, a hard disk or a removable compact disc driver on the body 400 of the electronic device 100. The removable module 300 can be removed from the body 400 in the Z direction 500 and inserted into the body 400 in the reverse direction. The locking device 200 includes a switch 210, a base 220 connected with the switch 210 and an elastic component 250. The body 400 has a track 410 and a switch 210 disposed thereon. The switch 210 can slide on the track 410. The elastic component 250 is disposed between the base 220 and the body 400.

Figure 2:
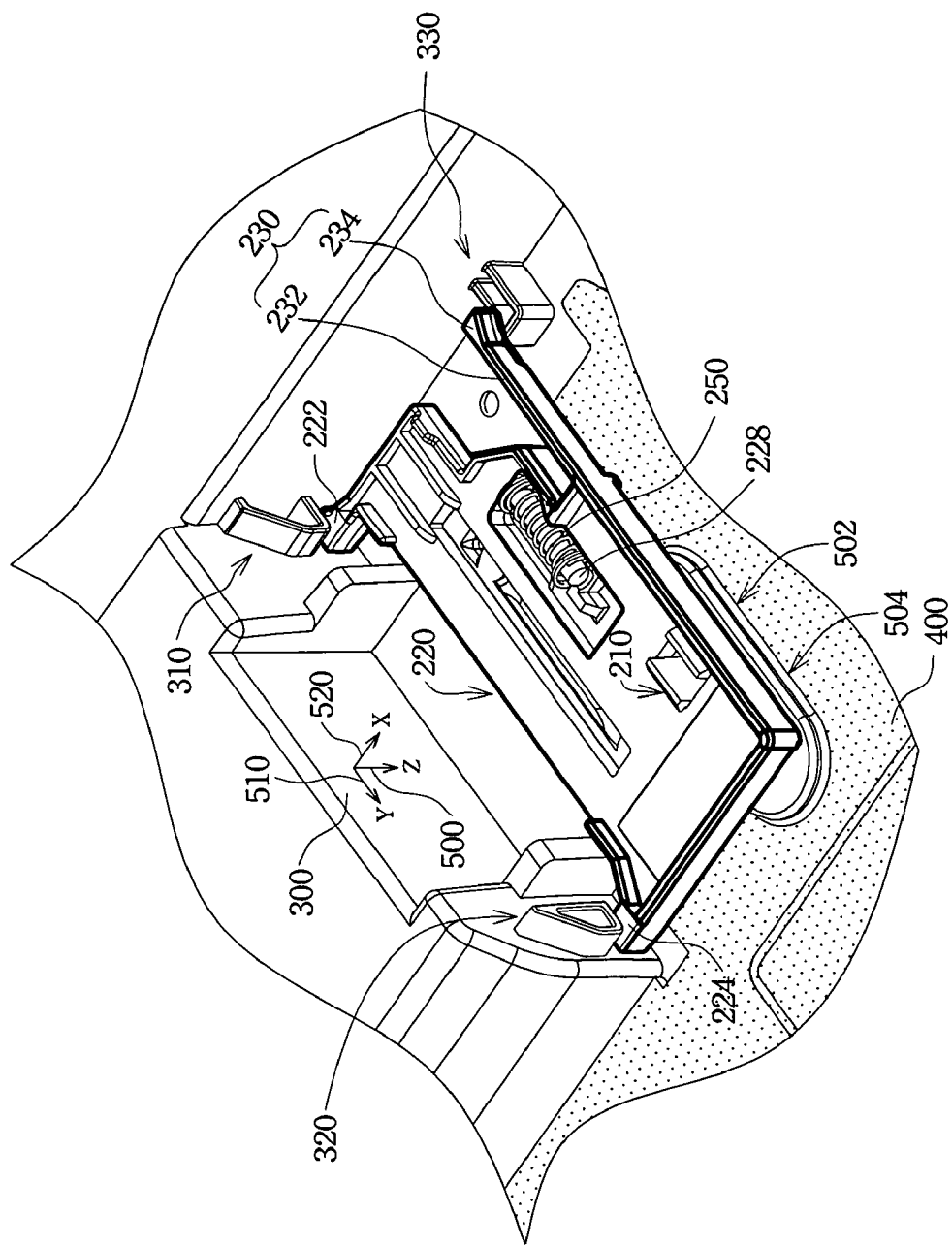
FIG. 2 is a schematic and partial view from inside of the body in FIG. 1 when the base and the switch are located in a locked position.

FIG. 2 is a schematic and partial view from inside of the body in FIG. 1 when the base 220 and the switch 210 are located in a locked position 502. Referring to FIG. 2, the base 220 has protruding portions 222, 224 and a positioning portion 230. The protruding portions 222, 224 are disposed on two ends of the base 220. The removable module 300 has first blocks 310, 320 and a second block 330. The protruding portion 222 and the protruding portion 224 are coupled with the first block 310 and the first block 320 respectively, such that the locking device 200 can prevent the removable module 300 from being separated from the body 400 in the Z direction 500.

With continued reference to FIG. 2, the elastic component 250 such as a spring is disposed between the base 220 and the body 400. For example, the elastic component 250 is disposed on the rod 228 of the base 220 to provide a recovery force to the base 220. With the recovery force, the base 220 and the switch 210 can be held in the locked position 502 when the removable module 300 is removed from the body 400. Moreover, the base 220 is pushed back by the elastic component 250 when the base 220 and the switch 210 are moved from the locked position 502 to an unlocked position 504.

Figure 3:
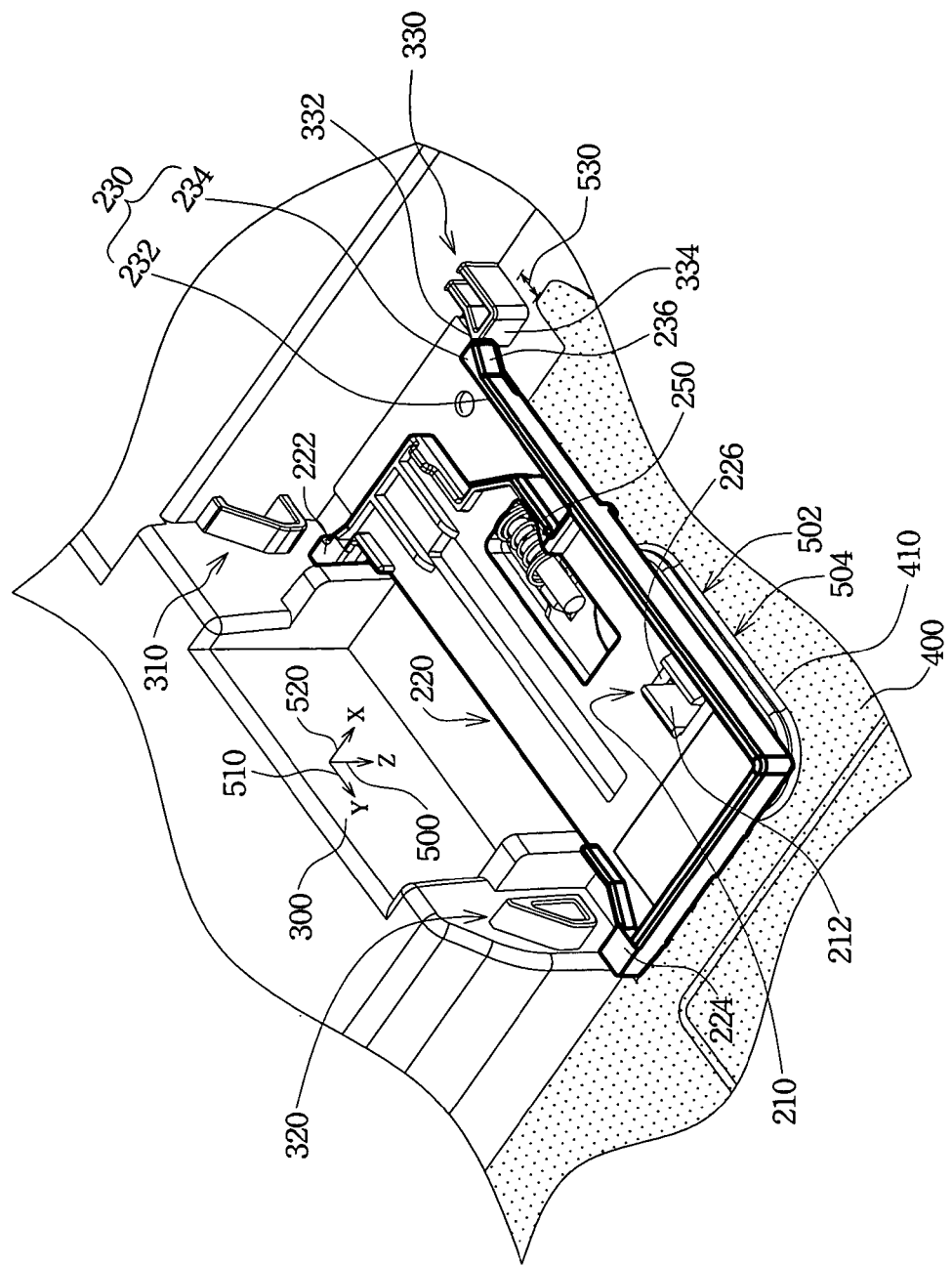
FIG. 3 is a schematic and partial view from inside of the body in the FIG. 1 when the base and the switch are located in an unlocked position.

FIG. 3 is a schematic and partial view from inside of the body in the FIG. 1 when the base 220 and the switch 210 are located in an unlocked position 504. The base 220 has a hole 226. The switch 210 has a connecting portion 212 piercing the hole 226. The connecting portion 212 connects the base 220 with the switch 210, such that the base 220 moves along the Y direction 510 when the switch 210 slides on the track 410 along the Y direction 510.

With continued reference to FIG. 3, the base 220 and the switch 210 are located in the unlocked position 504. In this state, the removable module 300 can be removed in the Z direction 500. More specifically, the base 220 and the switch 210 is moved from the locked position 502 to the unlocked position 504, which causes the protruding portions 222, 224 to be uncoupled with the first block 310, 320. The positioning portion 230 has a flexible rod 232 and a head portion 234. The head portion 234 of the positioning portion 230 is coupled with an end surface 334 of the second block 330. Thus, the base 220 and the switch 210 stay on the unlocked position 504 when the removable module 300 is on the body 400 and the base 220 is pushed from the locked position 502 to the unlocked position 504.

With continued reference to FIG. 3, the head portion 234 has a first surface 236. The second block 330 has a second surface 332. The first surface 236 is coupled with the second surface 332 and the flexible rod 232 deforms opposite to the X direction 520 when the base 220 is moved from the locked position 502 to the unlocked position 504. The first surface 236 is coupled with the second surface 332 along the Y direction 510 for a first coupling length 530. The length between the locked position 502 and the unlocked position 504 is longer than the first coupling length 530. The first surface 236 is separated from the second surface 332 when the base 220 and the switch 210 are moved to the unlocked position 504. The flexible rod 232 recovers and the head portion 234 is coupled with the end surface 334, so that the positioning portion 230 keeps the base 220 and the switch 210 in the unlocked position 504 and prevents the elastic component 250 from pushing the base 220 back to the locked position 502. Thus, the user can remove the removable module 300 in the Z direction 500 by using one hand, thereby freeing the other hand for other tasks.

Figure 4:
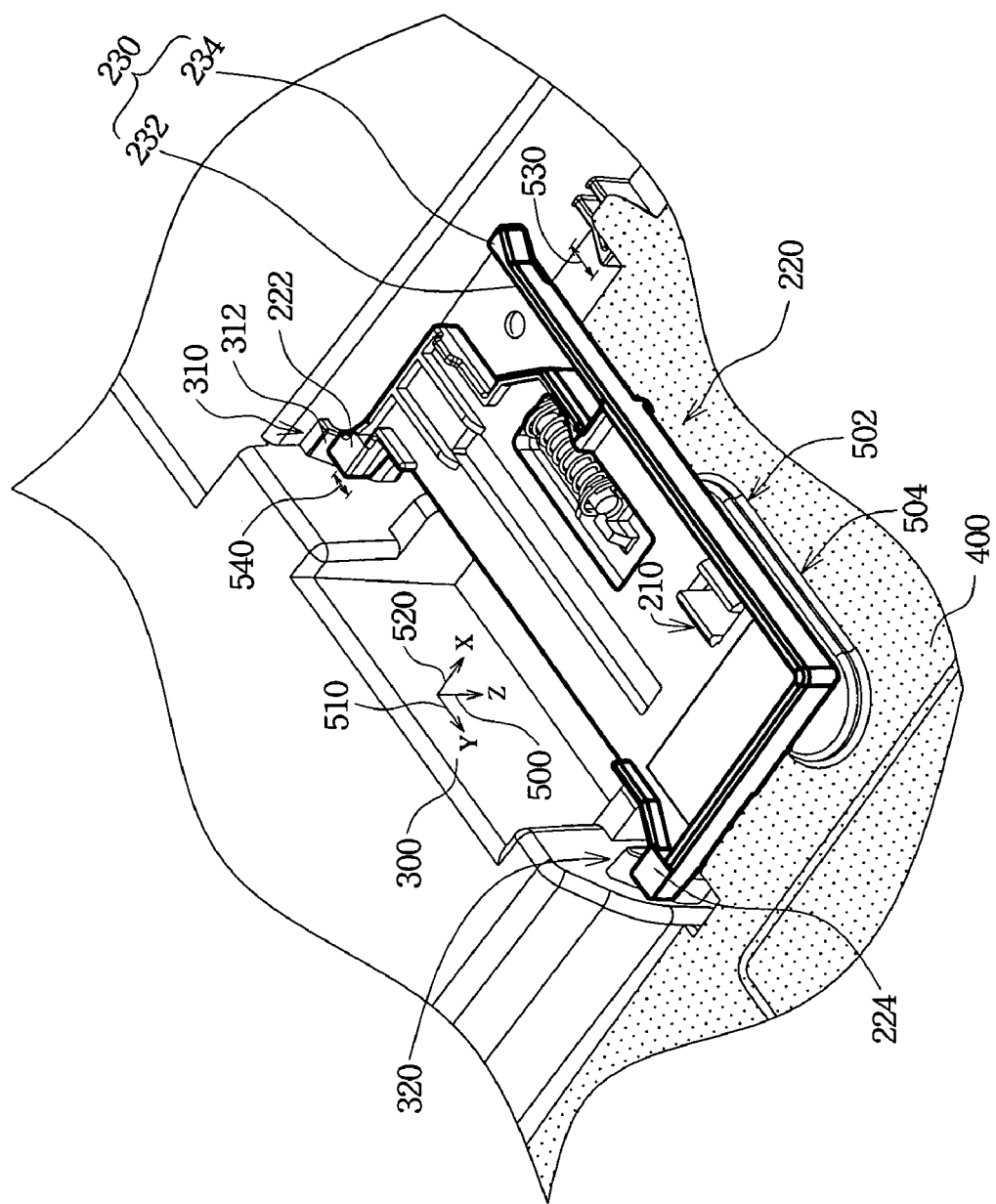
FIG. 4 is a schematic and partial view from inside of the body in the FIG. 1 when the removable module is installed into the body.

FIG. 4 is a schematic and partial view from inside of the body in the FIG. 1 when the removable module 300 is installed into the body 400. Referring to FIG. 4, the first block 310 has an incline 312. The protruding portion 222 is coupled with the incline 312 when the removable module 300 is installed into the body 400, such that the base 220 and the switch 210 is moved from the locked position 502 along the Y direction 510. The first block 320 and the protruding portion 224 are similar to the first block 310 and the protruding portion 222.

It is worth noting that the protruding portion 222 is coupled with the incline 312 along the Y direction 510 for a second coupling length 540 during the installation procedure of the removable module 300. The base 220 and the switch 210 also move along the Y direction 510 for the second coupling length 540 during the installation procedure of the removable module 300. Since the first coupling length 530 is longer than the second coupling length 540, the base 220 and the switch 210 can return to the locked position 502 after the removable module 300 is installed into the body 400. In other words, the protruding portion 222 separates from the incline 312 and the base 400 is pushed back to the locked position 502 by the elastic component 250 after the removable module 300 is installed into the body 400.

According to an embodiment mentioned above, the locking device of the present invention has the following advantages. Firstly, the base of the locking device has a positioning portion that causes the base stay on the unlocked position when the removable module is assembled on the body and the base is pushed from the locked position to the unlocked position. Thus, users can remove the removable module by using one hand. Secondly, the removable module can be removed from the body along a vertical direction, thus reducing the space needed to remove and install the removable module.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A locking device for locking a removable module on a body of an electronic device, the removable module having at least one first block and a second block, the locking device comprising:
 a switch, disposed on the body;
 a base, connecting with the switch, having at least one protruding portion and a positioning portion, wherein the protruding portion is coupled with the first block to prevent the removable module from separating from the body when the base is located in a locked position, and the removable module can be separated from the body when the base is moved from the locked position to an unlocked position; and
 an elastic component, disposed between the base and the body, wherein the elastic component provides a recovery force to the base when the base is moved from the locked position,
 wherein the positioning portion is coupled with the second block to hold the base in the unlocked position when the removable module is installed on the body and the base is moved from the locked position to the unlocked position.

2. A locking device as recited in claim 1, wherein the protruding portion includes two protruding portions disposed on two ends of the base, the removable module has two first blocks, and the protruding portions couple with the first blocks when the base is located in the locked position.

3. A locking device as recited in claim 1, wherein the protruding portion is coupled with an incline of the first block when the removable module is installed into the body.

4. A locking device as recited in claim 1, wherein the positioning portion includes a flexible rod and a head portion, the head portion is coupled with the second block, the base stays on the unlocked position when the removable module is installed on the body and the base is moved from the locked position to the unlocked position.

5. A locking device as recited in claim 4, wherein the head portion has a first surface, the first surface is coupled with a second surface of the second block, the flexible rod deforms when the removable module is installed on the body and the base is moving from the locked position to the unlocked position.

6. A locking device as recited in claim 1, wherein the first surface is coupled with the second surface for a first coupling length, the protruding portion is coupled with the first block for a second coupling length, the length between the locked position and the unlocked position is longer than the first coupling length, and the first coupling length is longer than the second coupling length.

7. A locking device as recited in claim 1, wherein the elastic component is a spring.

8. A locking device as recited in claim 1, wherein the body has a track, and the base moves when the switch slides on the track.

9. An electronic device comprising:
 a body;
 a removable module, having at least one first block and a second block; and
 a locking device for locking the removable module on the body, comprising:
  a switch, disposed on the body;
  a base, connecting with the switch, having at least one protruding portion and a positioning portion, wherein the protruding portion is coupled with the first block to prevent the removable module from separating from the body when the base is located in a locked position, and the removable module can be separated from the body when the base is moved from the locked position to an unlocked position; and
  an elastic component, disposed between the base and the body, wherein the elastic component provides a recovery force to the base when the base is moved from the locked position,
  wherein the positioning portion is coupled with the second block to hold the base in the unlocked position when the removable module is installed on the body and the base is moved from the locked position to the unlocked position.

10. An electronic device as recited in claim 9, wherein the protruding portion includes two protruding portions disposed on two ends of the base, the removable module has two first blocks, and the protruding portions couple with the first blocks when the base is located in the locked position.

11. An electronic device as recited in claim 9, wherein the protruding portion is coupled with an incline of the first block when the removable module is installed into the body.

12. An electronic device as recited in claim 9, wherein the positioning portion includes a flexible rod and a head portion, the head portion is coupled with the second block, the base stays in the unlocked position when the removable module is installed on the body and the base is moved from the locked position to the unlocked position.

13. An electronic device as recited in claim 12, wherein the head portion has a first surface, the first surface is coupled with a second surface of the second block, the flexible rod deforms when the removable module is installed on the body and the base is moving from the locked position to the unlocked position.

14. An electronic device as recited in claim 9, wherein the first surface is coupled with the second surface for a first coupling length, the protruding portion is coupled with the first block for a second coupling length, the length between the locked position and the unlocked position is longer than the first coupling length, and the first coupling length is longer than the second coupling length.

15. An electronic device as recited in claim 9, wherein the removable module is a battery, a floppy disk, a hard disk or a compact disc driver.

* * * * *